United States Patent [19]

Ko et al.

[11] Patent Number: 4,898,277

[45] Date of Patent: Feb. 6, 1990

[54] COVER-LOCKING DEVICE FOR A VIDEO TAPE CASSETTE

[75] Inventors: Jae K. Ko; Kyung H. Chung, both of Chungchongnam, Rep. of Korea

[73] Assignee: SKC Limited, Rep. of Korea

[21] Appl. No.: 298,344

[22] Filed: Jan. 17, 1989

[30] Foreign Application Priority Data

Aug. 18, 1988 [KR] Rep. of Korea .................... 88-13473

[51] Int. Cl.⁴ .......................................... B65D 85/672
[52] U.S. Cl. .................................. 206/387; 220/334; 220/315
[58] Field of Search ................. 206/387; 220/334, 315

[56] References Cited

U.S. PATENT DOCUMENTS

| | | | |
|---|---|---|---|
| 4,422,550 | 12/1983 | Okamura | 206/387 |
| 4,485,988 | 12/1984 | Kikuya et al. | 206/387 |
| 4,527,691 | 7/1985 | Pertzsch et al. | 206/387 |

Primary Examiner—Joseph Man-Fu Moy
Attorney, Agent, or Firm—Lowe, Price, LeBlanc, Becker & Shur

[57] ABSTRACT

A cover-locking device for a video tape cassette comprising a cover-locking pin having a lock-releasing protrusion and an engaging protrusion and being pivotably supported in a half-down of the cassette. The cover-locking device also comprises a push member integrally formed on the inner surface of a half-up of the cassette, and an operating member formed on the upper portion of the cover-locking pin. The operating member is always in contact with the push member.

1 Claim, 4 Drawing Sheets

COVER-LOCKING DEVICE FOR A VIDEO TAPE CASSETTE

BACKGROUND OF THE INVENTION

The present invention relates to a cover-locking device for a video tape cassette of a VHS mode. In particular, the present invention relates to a cover-locking device for a video tape cassette wherein the cover can be opened and closed only by a cover-locking pin which is disposed in a chamber provided at the front end portion of a half-down of the video tape cassette at the right side thereof and adapted to open and close the cover, so that the necessity of a locking spring can be eliminated.

Conventionally, each video tape cassettes has, at the front thereof, a cover which is adpated to protect the tape when the tape cassette is not loaded on a deck. When the tape cassette is loaded on the deck, the locking of the cover is released, so that the cover is automatically opened. Referring to FIG. 5, a conventional cover-locking device is shown. As shown in the drawing, a locking spring 23 is assembled on a cover-locking pin 22 disposed in a chamber 21 formed at the front end portion of a half-down 20 of a tape cassette at the right side thereof. In order to prevent the separation of the spring from the cover-locking pin, the cover-locking pin has a shaft 24 supporting said spring and a spring protection rib 25. As a result, the overall construction of the cover-locking pin becomes complex. Furthermore, the cover-locking spring itself is a separate steel wire element which has to be separately manufactured. In particular, even when the assembly of the tape cassette is carried out by a robot on an automatic assembling line, the cover-locking spring should be manually assembled. Consequently, there are problems of the inconvenience in assembling the tape cassette and the increase of the manufacturing cost.

SUMMARY OF THE INVENTION

Therefore, an object of the present invention is to eliminate the disadvantages encountered in the above-mentioned prior art and to provide a cover-locking device for a video tape cassette, which can eliminate the use of the cover-locking spring so that the assembly of the cassette, which is carried out manually or automatically by a robot, can be easily accomplished and the manufacturing cost can be reduced.

In accordance with the present invention, this object is accomplished by providing a cover-locking device for a video tape cassette including a half-down, a half-up, and a chamber formed at a front portion of said half-down at one end thereof, said cover-locking device comprising a cover-locking pin having a lock-releasing protrusion and an engaging protrusion, and a pair of shafts laterally protruding from opposite sides of said cover-locking pin pivotably supporting said cover-locking pin on support members disposed in said chamber; said cover-locking device further comprising; a push member integrally formed on an inner surface of said half-up of said tape cassette and an operating member formed on an upper portion of said cover-locking pin and protruding higher than said pair of shafts, said operating member being in contact with said push member when said cover-locking pin is supported on said support members.

BRIEF DESCRIPTION OF THE DRAWINGS

The present invention will be described in greater detail hereinafter with reference to the accompanying drawings wherein;

FIGS. 4A and 4B are partial sectional views showing the operating conditions of the cover-locking device of the present invention, wherein FIG. 4A shows the condition when an engaging protrusion of a cover-locking pin is engaged in an engaging groove of the cover, while FIG. 4B shows the condition when said engaging protrusion is disengaged from said engaging groove.

DETAILED DESCRIPTION OF THE PREFERRED EMBODIMENTS

Figure 1:
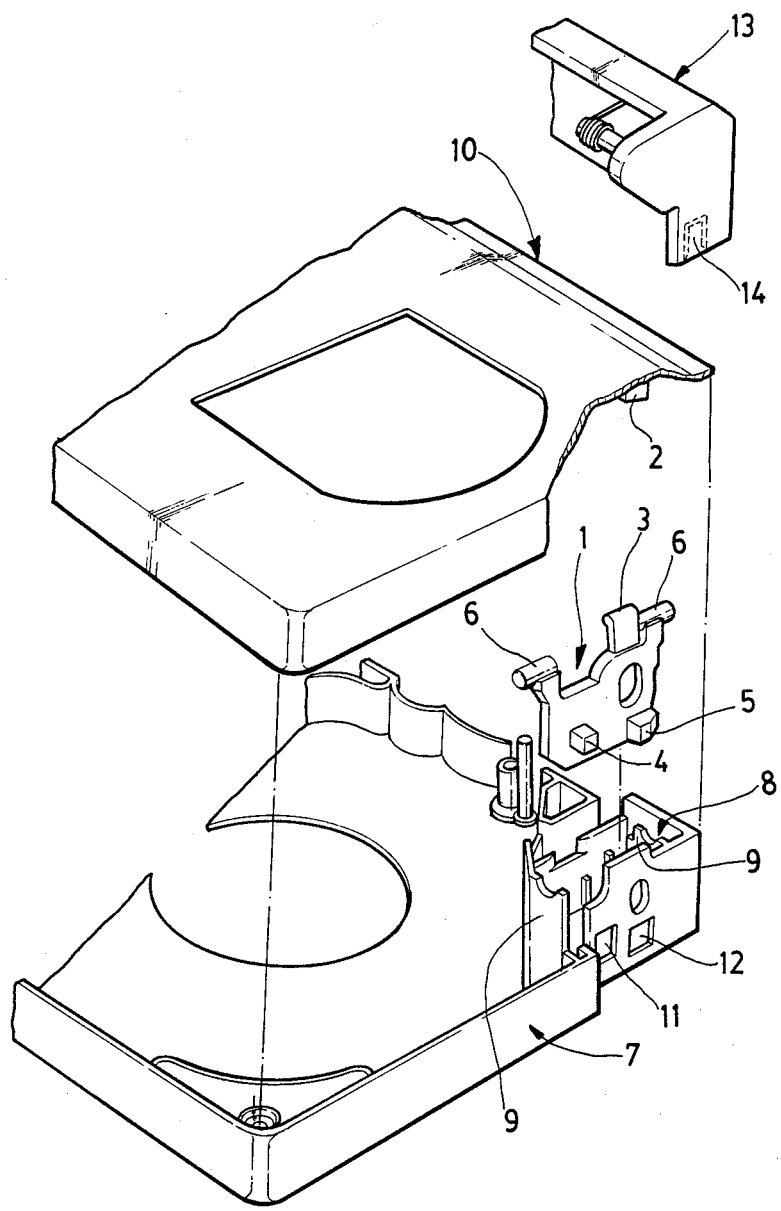
FIG. 1 is an exploded perspective view of a cover-locking device for a video tape cassette in accordance with the present invention.
Figure 2:
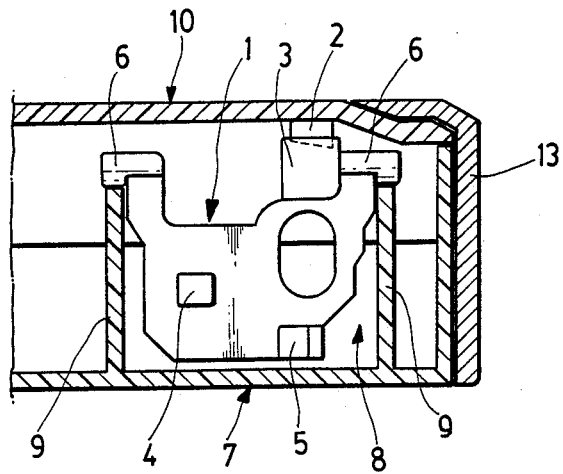
FIG. 2 is a partially broken-out front view of the cover-locking device of the present invention.
Figure 3:
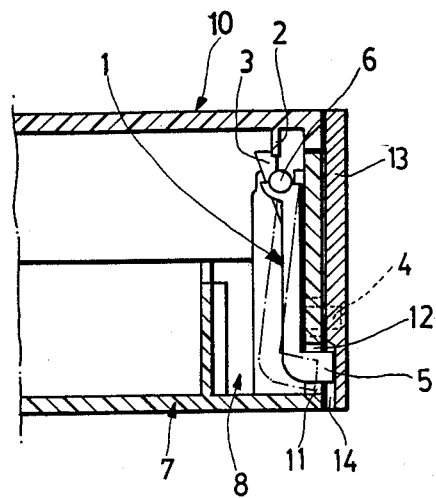
FIG. 3 is a partially broken-out side view of the cover-locking device of the present invention.
Figure 4A:
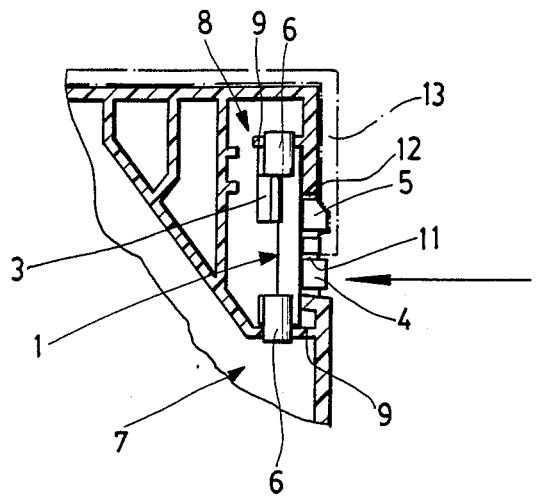
Figure 4B:
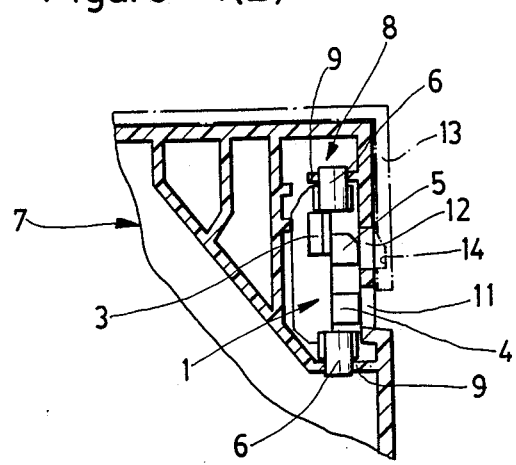
Figure 5:
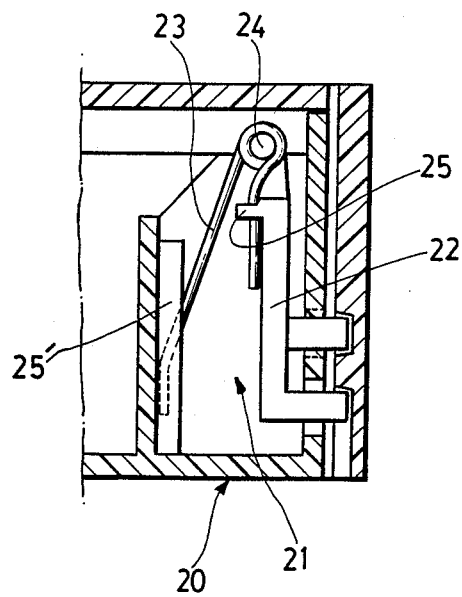
FIG. 5 is a partial sectional view of a covor-locking device of a prior art.

Referring to FIG. 1, there is partially shown a video tape cassette to which a cover-locking device according to the present invention is applied. The video tape cassette generally comprises a half-down 7 and a half-up 10. At the right side of the half-down 7, a chamber 8 is formed at the front portion of said half-down. The chamber 8 receives a cover-locking device according to the present invention. The cover-locking device of the present invention comprises a cover-locking pin 1 provided at one surface thereof with a lock-releasing protrusion 4 and an engaging protrusion 5, and a pair of shafts 6 outwardly and laterally protruded from the both sides of said pin 1. The shafts 6 of cover-locking pin 1 are pivotably supported on support members 9 disposed in the chamber 8 of the half-down 7, so that the cover-locking pin 1 may be pivotably supported on the half-down 7.

In accordance with the present invention, a push member 2 is integrally formed on the upper inner surface of the half-up 10 of the tape cassette. An operating member 3 is also formed on the upper portion of the cover-locking pin 1. The operating member 3 protrudes higher than the shafts 6 of the pin 1 so as to be in contact with the push member 2.

In the drawings, the reference numeral "11" designates a through-hole for the lock-releasing protrusion, "12" a through-hole for the engaging protrusion, "13" a cassette cover, and "14" an engaging groove.

The assembly of the cover-locking device of the present invention in the tape cassette is simply accomplished by pivotably supporting right and left shafts 6 of the cover-locking pin 1 on the support members 9 in the chamber 8 of the half-down 7 and then assembling the half-up 10 on the half-down 7. In the assembled condition, the push member 2 on the inner surface of the half-up 10 is in contact with the operating member 3 on the upper portion of the pin 1. As a result, the cover-locking pin 1 pivots about the support members 9 such that the pin 1 is urged to be in contact with one side inner surface of the chamber 8. Due to the force applied to the operating member 3 the lock-releasing protrusion 4 and the engaging protrusion 5 are outwardly protruded through the through-holes 11 and 12, respectively. In this manner, when the cassette cover is in the closed position, the engaging protrusion 5 is engaged in the engaging groove 14 of the cover 13. Thus, the cover 13 cannot be optionally opened in such normal condition.

When the tape cassette is loaded on a deck, the lock-releasing protrusion 4 which has been outwardly protruded through the throughhole 11 formed at the half-down 7 comes in contact with a lock-releasing spring (not shown) protruded from one side of a cassette holder of the deck. As a result, the lock-releasing protrusion 4 is retracted through the throughhole 11, thereby causing the cover-locking pin 1 to pivot about the support members 9 such that the operating member 3 of the pin 1 is forcedly urged upon the push member 2. Simultaneously, the cover 13 is automatically opened by a spring force of a spring mounted on the cover. By forcedly urging the operating member 3 upon the push member 2, a return pressure is generated. When the tape cassette is unloaded from the deck, the return pressure causes to pivots the cover-locking pin 1 to pivot about the support members 9 to its original position wherein the pin 1 is in contact with one side inner surface of the chamber 8 and the lock-releasing protrusion 4 and the engaging protrusion 5 are outwardly protruded through the through-holes 11 and 12, respectively. Thus, the engaging protrusion 5 is engaged again in the engaging groove 14 of the cover 13, thereby causing the cover 13 to be locked in its closed position.

As apparent from the above description, the cover-locking device according to the present invention utilizes no conventional locking spring. In accordance with the present invention, a push member which functions as the locking spring is integrally formed on the upper inner surface of the half-up of the tape cassette.

In order to cooperate with the push member, an operating member is also formed on the upper portion of the cover-locking pin and protruded higher than the shafts of the pin, so as to be incontact with said push member. In accordance with this simple construction, the assembly of the tape cassette, which is carried out manually or automatically by a robot, can be easily reduced, in view of the fact that no locking spring is used.

What is claimed is:

1. A cover-locking device for a video tape cassette including a half-down, a half-up, and a chamber formed at a front portion of said half-down at one end thereof, said cover-locking device comprising a cover-locking pin having a lock-releasing protrusion and an engaging protrusion, and a pair of shafts laterally protruding from opposite upper sides of said cover-locking pin for pivotably supporting said cover-locking pin on support members disposed in said chamber; said cover-locking device further comprising;
    a push member integrally formed on an inner surface of said half-up of said tape cassette; and
    an operating member formed on an upper portion of said cover-locking pin and protruding higher than said pair of shafts, said operating member being in contact with said push member when said cover-locking pin is supported on said support members.

* * * * *